UNITED STATES PATENT OFFICE.

KARL HEINRICH WOLMAN, OF IDAWEICHE, NEAR OPPELN, GERMANY, ASSIGNOR TO MAX BARSCHALL, OF NEW YORK, N. Y.

LIQUOR FOR IMPREGNATING WOOD.

936,070.  Specification of Letters Patent.  Patented Oct. 5, 1909.

No Drawing. Application filed April 14, 1905. Serial No. 255,651.

*To all whom it may concern:*

Be it known that I, KARL HEINRICH WOLMAN, of Idaweiche, near Oppeln, Germany, a subject of the Grand Duke of Baden, and a resident of Prussia, German Empire, have invented a new and useful Liquor for Impregnating Wood, of which the following is a specification.

This invention relates to the art of protecting wood against rotting, damage done by worms, insects and other animals, and other destructive causes by impregnating it with solutions of inorganic salts composed of oxids of heavy metals and strong mineral acids.

It consists in a new composition of matter or improved liquor hereinafter fully described, wherein said salts are combined with means for neutralizing or eliminating certain bad effects resulting from said heavy metal salts when used alone.

It is well known to those skilled in the art of preserving wood, that wood impregnated with salts of the kind specified, such as sulfate of iron, sulfate of copper, chlorid of zinc, sulfate of aluminium and the like, which are largely in use, is found after a certain time in a state of decay and that such decay continues more or less rapidly but in any event results in a complete destruction of the wood. Now I have discovered the cause of such decay and its progress. Salts of the kind above specified have a tendency to decompose into basic salts and free acid, and it is by the contact of the said salts with the fiber of the wood that their said tendency is excited in a considerable and increasing degree. Thus, when wood is impregnated for instance with sulfate of iron, sulfuric acid will be set free within the pores of the wood and being in most intimate contact with the cellulose it will chemically act upon the same in the nascent state, and the cellulose will be decayed thereby. And such decay goes on in increasing proportion because the sulfuric acid, by its action upon the cellulose, is not rendered inactive but remains in the active state and, moreover, its quantity is gradually increased by further decomposition of the iron sulfate. In case of chlorid of zinc free hydrochloric acid will be present as the decaying agent. Thus salts of the kind specified, though very powerful agents in so far as rotting and other destructive causes are concerned, are vitiated by a property that counteracts the preserving effect intended to be created. To do away with this deleterious action of the heavy metal salts specified, that is to say, to render the same harmless against cellulose without reducing their antiseptic and so-called mineralizing properties the present improvement consists in so compounding the liquor that the molecules of said heavy metal salts become intimately intermixed with molecules of a substance capable of preventing the strong mineral acid liberated from acting or paralyzing their action, upon the cellulose, transforming the acid split off into a harmless compound with regard to the wood fiber. As such substance may be used a salt or salts of acids that are weaker than the acids of the heavy metal salts. I have discovered that the best results are obtained by means of a salt or salts of organic acids that have but an insignificant effect upon wood. Among these I prefer to use such salts as are formed with volatile organic acids, the most advantageous of which have proved to be the acetates and formiates. Moreover, I prefer the ammonia salts of such volatile organic acids, for instance the ammonium acetate. It is not necessary to apply the salts formed with the said organic acids in a chemically pure state, but they may be used in their crude state. For instance in the case of ammonium acetate the crude salt as obtained by saturating raw pyrolignic acid with raw ammonia may be used.

A very efficacious composition for my improved wood preserving liquor consists for instance of the following ingredients, combined in the proportions stated, viz: water, substantially pure, 1,000 liters; sulfate of iron, 30 kilograms; sulfate of aluminium, 25 kilograms; crude acetate of ammonium, 1.6 kilograms. These ingredients are to be thoroughly mingled by agitation until solution of the salts is obtained.

When wood is impregnated with my improved preserving liquor, as soon as any strong mineral acid splits off from the heavy metal salt, for instance sulfuric acid, it meets the weaker organic salt, for instance acetate of ammonia, and reacting therewith, decomposes the same into ammonia with which it combines to form ammonia sulfate, and into acetic acid which does no harm to the wood and owing to its volatility, gradually escapes from the wood. Moreover, when the wood is treated with my improved liquor by boiling it with the same under pressure, the vessels used are protected against corrosion, as any mineral acid set free by the combined action of temperature and pressure upon the heavy metal salts, is at once neutralized by its reaction with the organic salt present.

What I claim as my invention is:

1. The herein described composition of matter for impregnating wood consisting in a compound solution of heavy metal salts of strong mineral acid, and an ammonium salt of an organic acid which is weaker than the acid of the heavy metal salts present, substantially as described and for the purpose stated.

2. The hereindescribed composition of matter for impregnating wood consisting in a compound solution of a heavy metal salt of a strong mineral acid and acetate of ammonium, substantially as described and for the purpose specified, said compound being characterized by the fact that the strong mineral acid resulting from the mineral salts will be neutralized by the acetate of ammonium.

3. The hereindescribed composition of matter for impregnating wood consisting in a compound solution of iron sulfate and acetate of ammonium, substantially as described and for the purpose specified, said compound being characterized by the fact that the strong mineral acid resulting from the iron sulfate will be neutralized by the acetate of ammonium.

4. The herein described composition of matter for impregnating wood consisting in a compound solution of iron sulfate and raw acetate of ammonium, substantially as and for the purpose specified.

In testimony whereof I have hereunto set my hand in presence of two subscribing witnesses.

KARL HEINRICH WOLMAN.

Witnesses:
   HENRY HASPER,
   WOLDEMAR HAUPT.